(12) United States Patent
Li et al.

(10) Patent No.: US 10,937,016 B2
(45) Date of Patent: Mar. 2, 2021

(54) METHOD AND APPARATUS FOR BINDING BANK CARD IN PAYMENT APPLICATION

(71) Applicant: HUAWEI TECHNOLOGIES CO., LTD., Guangdong (CN)

(72) Inventors: Yu Li, Beijing (CN); Xiujie Huang, Beijing (CN); Changqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/276,134

(22) Filed: Feb. 14, 2019

(65) Prior Publication Data

US 2019/0180267 A1 Jun. 13, 2019

Related U.S. Application Data

(63) Continuation of application No. PCT/CN2017/095100, filed on Jul. 31, 2017.

(30) Foreign Application Priority Data

Aug. 15, 2016 (CN) .......................... 201610671763.8

(51) Int. Cl.
*G06Q 20/32* (2012.01)
*G06Q 20/34* (2012.01)
(Continued)

(52) U.S. Cl.
CPC ..... *G06Q 20/3221* (2013.01); *G06K 9/00469* (2013.01); *G06K 9/00483* (2013.01);
(Continued)

(58) Field of Classification Search
None
See application file for complete search history.

(56) References Cited

U.S. PATENT DOCUMENTS

2009/0008445 A1 1/2009 Chen et al.
2014/0052636 A1* 2/2014 Mattes ................. G06Q 20/409
705/44
(Continued)

FOREIGN PATENT DOCUMENTS

CN 1916945 A 2/2007
CN 101197045 A 6/2008
(Continued)

OTHER PUBLICATIONS

International Search Report dated Sep. 30, 2017 in corresponding International Application No. PCT/CN2017/095100.
(Continued)

*Primary Examiner* — Peter Hoang
(74) *Attorney, Agent, or Firm* — Conley Rose, P.C.

(57) ABSTRACT

A method and an apparatus for binding a bank card in a payment application are disclosed. The method includes the following steps: obtaining a picture of a to-be-bound bank card; identifying the picture of the bank card to obtain bank card information, where the bank card information includes a card number of the bank card and information about a bank card pattern; searching, based on the information about the bank card pattern, for a bank card background picture that matches the information about the bank card pattern; and superimposing the card number of the bank card on the bank card background picture to obtain a virtual bank card consistent with the bank card. A technical solution provided in this application is advantageous to desired user experience.

20 Claims, 3 Drawing Sheets

(51) Int. Cl.
*G06Q 20/40* (2012.01)
*G06K 9/46* (2006.01)
*G06K 9/62* (2006.01)
*G06K 9/00* (2006.01)
*G06T 11/60* (2006.01)

(52) U.S. Cl.
CPC ............. *G06K 9/46* (2013.01); *G06K 9/6212* (2013.01); *G06K 9/6215* (2013.01); *G06Q 20/3276* (2013.01); *G06Q 20/34* (2013.01); *G06Q 20/409* (2013.01); *G06T 11/60* (2013.01)

(56) References Cited

U.S. PATENT DOCUMENTS

| | | | |
|---|---|---|---|
| 2015/0106218 A1 | 4/2015 | Moon et al. | |
| 2016/0259531 A1 | 9/2016 | Cho et al. | |
| 2019/0037342 A1 | 1/2019 | Block et al. | |

FOREIGN PATENT DOCUMENTS

| | | | | |
|---|---|---|---|---|
| CN | 101339639 | A | 1/2009 | |
| CN | 101859326 | A | 10/2010 | |
| CN | 101860814 | A | 10/2010 | |
| CN | 101901344 | A | 12/2010 | |
| CN | 102208033 | A | 10/2011 | |
| CN | 103106634 | A | 5/2013 | |
| CN | 103632266 | A | 3/2014 | |
| CN | 104065639 | A | 9/2014 | |
| CN | 104636958 | A | 5/2015 | |
| CN | 105307736 | A | 2/2016 | |
| CN | 105405022 | A | 3/2016 | |
| CN | 106327188 | A | 1/2017 | |
| KR | 101570354 | B1 | 11/2015 | |
| SG | 10201603768 | S | * 5/2016 | ............. G06Q 20/32 |
| WO | 2015067038 | A1 | 5/2015 | |

OTHER PUBLICATIONS

International Search Report, dated Sep. 30, 2017, in International Application No. PCT/CN217/095100 (4 pp.).
Written Opinion of the International Searching Authority, dated Sep. 30, 2017, in International Application No. PCT/CN217/095100 (8 pp.).
Office Action, dated Dec. 5, 2018, in Chinese Application No. 201610671763.8 (8 pp.).
Machine Translation and Abstract of Chinese Publication No. CN101197045, Jun. 11, 2008, 20 pages.
Machine Translation and Abstract of Chinese Publication No. CN101859326, Oct. 13, 2010, 20 pages.
Machine Translation and Abstract of Chinese Publication No. CN101901344, Dec. 1, 2010, 9 pages.
Machine Translation and Abstract of Chinese Publication No. CN102208033, Oct. 5, 2011, 12 pages.
Foreign Communication From a Counterpart Application, Chinese Application No. 201610671763.8, Chinese Office Action dated Sep. 20, 2019, 5 pages.

* cited by examiner

METHOD AND APPARATUS FOR BINDING BANK CARD IN PAYMENT APPLICATION

CROSS-REFERENCE TO RELATED APPLICATIONS

This application is a continuation of International Application No. PCT/CN2017/095100, filed on Jul. 31, 2017, which claims priority to Chinese Patent Application No. 201610671763.8, filed on Aug. 15, 2016. The disclosures of the aforementioned applications are hereby incorporated by reference in their entireties.

TECHNICAL FIELD

This disclosure relates to the communications field, and in particular, to a method and an apparatus for binding a bank card in a payment application.

BACKGROUND

With popularization of smartphones, an increasing quantity of transactions are completed in a non-cash manner, and a non-cash transaction is no longer completed by using a credit card but completed through mobile phone payment, especially for small-amount payment, which is often quick mobile phone payment. In an existing mobile phone payment scenario, a bank card is bound to a mobile phone. An existing binding method includes: manually entering a bank card number, and adding a bank card to a list of bank cards and marking the card number. An existing virtual bank card bound to a mobile phone is identified by a bank and a card number. When a plurality of bank cards are bound, a mix-up easily occurs, and inconvenience is caused to a user.

SUMMARY

This application provides a method for binding a bank card in a payment application, so that a problem that bound virtual bank cards are mixed up does not occur.

According to a first aspect, a method for binding a bank card in a payment application is provided. The method includes the following steps: obtaining a picture of a to-be-bound bank card; identifying the picture of the bank card to obtain bank card information, where the bank card information includes a card number of the bank card and information about a bank card pattern; searching, based on the information about the bank card pattern, for a bank card background picture that matches the information about the bank card pattern; and superimposing the card number of the bank card on the bank card background picture to obtain a virtual bank card consistent with the to-be-bound bank card, and storing the virtual bank card.

In the technical solution provided in the first aspect, the card number of the bank card is automatically obtained, and the card number is superimposed on the found bank card background picture to obtain the virtual bank card consistent with the bank card. In this way, during searching, a user can directly view a virtual card picture consistent with a physical card, so that the user can easily perform identification. Therefore, virtual bank cards are not mixed up, thereby facilitating use by the user.

In an optional solution, the bank card information further includes a card issuing bank of the bank card.

In another optional solution, a background picture set of the card issuing bank of the bank card may be searched based on the information about the bank card pattern for the bank card background picture that matches the information about the bank card pattern.

In this optional solution, a quantity of times of pattern information searching can be reduced.

In still another optional solution, the searching, based on the information about the bank card pattern, for a bank card background picture that matches the information about the bank card pattern specifically includes: extracting a local feature point of the bank card pattern, gathering all local feature points to obtain a first feature point set, extracting local feature points of all bank card patterns in a database, and gathering the local feature points of all the bank card patterns in the database to obtain a second feature point set; finding, from the second feature point set, a feature point that matches the first feature point set, and setting, as a candidate similar bank card picture, a bank card picture corresponding to the matched feature point in the second feature point set; and collecting statistics about a quantity of matched feature points in each candidate similar bank card picture, and determining a candidate similar bank card picture with a largest quantity of matched features as the bank card background picture that matches the information about the bank card pattern.

In this optional solution, repeated feature point matching can be effectively avoided, and a calculation amount can be reduced.

In yet another optional solution, the foregoing method may further include: calculating a difference between a value of the largest quantity of matched feature points and a value of a second largest quantity of matched feature points, and when the difference is greater than a specified threshold, determining the candidate similar bank card picture corresponding to the value of the largest quantity of matched feature points as the bank card background picture that matches the information about the bank card pattern; or when the difference is less than a specified threshold, extracting all feature points of a corresponding bank card background picture with the largest quantity of matched feature points, and if all the feature points have a same consistency function, determining the corresponding bank card background picture with the largest quantity of matched feature points as the bank card background picture that matches the information about the bank card pattern; or if all the feature points have different consistency functions, determining that the data has no bank card background picture that matches the information about the bank card pattern.

This optional solution additionally includes a technical solution in which no bank card background picture is matched, so that integrity of the technical solutions is improved.

According to a second aspect, an apparatus for binding a bank card in a payment application is provided. The apparatus includes: a photographing unit, configured to obtain a picture of a to-be-bound bank card; and a processing unit, configured to: identify the picture of the bank card to obtain bank card information, where the bank card information includes a card number of the bank card and information about a bank card pattern; search, based on the information about the bank card pattern, for a bank card background picture that matches the information about the bank card pattern; and superimpose the card number of the bank card on the bank card background picture to obtain a virtual bank card consistent with the bank card, and store the virtual bank card.

In an optional solution in the second aspect, the processing unit may perform all optional solutions in the first aspect and a combination of the optional solutions in the first aspect. Details are not described herein again.

In the technical solutions provided in this application, the card number of the bank card is automatically obtained, and the card number is superimposed on the found bank card background picture to obtain the virtual bank card consistent with the bank card. In this way, during searching, a user can directly view a virtual card picture consistent with a physical card, so that the user can easily perform identification. Therefore, virtual bank cards are not mixed up, thereby facilitating use by the user.

BRIEF DESCRIPTION OF DRAWINGS

To describe the technical solutions in embodiments of this application more clearly, the following briefly describes the accompanying drawings required for describing the embodiments.

DESCRIPTION OF EMBODIMENTS

Figure 1:
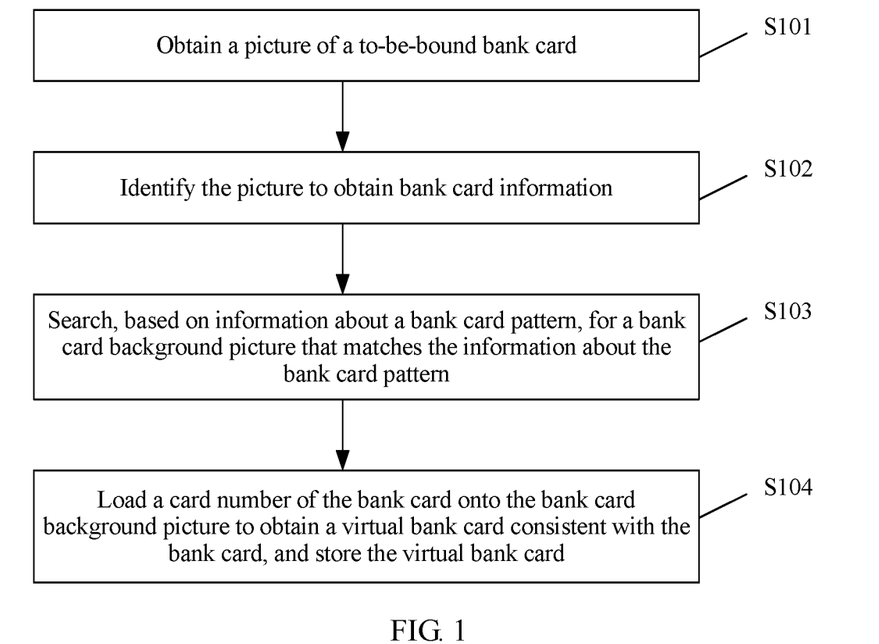
FIG. 1 is a flowchart of a method for binding a bank card in a payment application according to an embodiment of this application.

FIG. 1 is a flowchart of a method for binding a bank card in a payment application according to this application. The method shown in FIG. 1 is implemented in an intelligent terminal, and the intelligent terminal includes but is not limited to a mobile phone, a tablet computer, and a personal digital assistant (Personal Digital Assistant, PDA for short). The method is shown in FIG. 1, and includes the following steps.

Step S101: Obtain a picture of a to-be-bound bank card.

In step S101, the picture of the to-be-bound bank card may be obtained by using a camera disposed on an intelligent terminal, and certainly, in actual application, may be obtained in another manner. A manner of obtaining the picture of the bank card is not limited in a technical solution provided in an embodiment of this application.

Step S102: Identify the picture to obtain bank card information, where the bank card information may include a card number of the bank card and information about a bank card pattern.

In step S102, an identification algorithm for identifying the picture may be an existing picture or text identification algorithm. A specific representation form of the identification algorithm is not limited in an embodiment of this application.

Step S103: Search, based on the information about the bank card pattern, for a bank card background picture that matches the information about the bank card pattern.

A method for implementing step S103 may be specifically as follows:

comparing the information about the bank card pattern with bank card background pictures in a database one by one, where a consistent bank card determined through the comparison is the bank card background picture that matches the information about the bank card pattern.

Certainly, a method for implementing step S103 may alternatively be as follows:

extracting a local feature point of the bank card pattern, gathering all local feature points to obtain a first feature point set, extracting local feature points of all bank card patterns in a database, and gathering the local feature points of all the bank card patterns to obtain a second feature point set, where the feature point may be described by using features such as SURF, ORB, and an SIFT; where the feature point includes but is not limited to a shape, a color, and the like of the pattern;

finding, from the second feature point set, a feature point that matches the first feature point set, and setting, as a candidate similar bank card picture, a bank card picture corresponding to the matched feature point in the second feature point set; and collecting statistics about a quantity of matched feature points in each candidate similar bank card picture, and determining a candidate similar bank card picture with a largest quantity of matched features as the bank card background picture that matches the information about the bank card pattern.

In addition, when calculation is performed on a to-be-queried bank card background picture to obtain an image that matches the to-be-queried bank card background picture, because a negative sample without a corresponding bank card background picture needs to be excluded, a final result is determined based on a threshold that is set by collecting statistics about a plurality of samples.

A specific determining method may be as follows: calculating a difference between a value of the largest quantity of matched feature points and a value of a second largest quantity of matched feature points, and when the difference is greater than a specified threshold (which may be independently set by a user or a manufacturer), determining a candidate similar bank card picture with the largest quantity of matched feature points as the bank card background picture that matches the information about the bank card pattern; or when the difference is less than a specified threshold, extracting all feature points of a corresponding bank card background picture with the largest quantity of matched feature points, and if all the feature points have a same consistency function, determining the corresponding bank card background picture with the largest quantity of matched feature points as the bank card background picture that matches the information about the bank card pattern; or if all the feature points have different consistency functions, determining that there is no bank card background picture that matches the information about the bank card pattern.

In the foregoing pattern matching solution, a calculation amount of matching can be effectively reduced. Because in the pattern matching solution, feature points of all bank card background pictures are collected for picture comparison, there is no need to perform one-to-one comparison, so that a quantity of times of pattern comparison is effectively reduced. Therefore, the pattern matching solution is advantageous to a reduced calculation amount. In addition, the difference between the value of the largest quantity of matched feature points and the value of the second largest quantity of matched feature points is calculated, so that a phenomenon that no image is matched can be effectively avoided.

Step S104: Load the card number of the bank card onto the bank card background picture to obtain a virtual bank card consistent with the bank card, and store the virtual bank card.

In the technical solution provided in this application, the picture of the bank card is obtained, the picture of the bank card is automatically identified to obtain the card number, and the bank card is bound, so that an operation of binding the bank card is more convenient. A high-resolution background pattern corresponding to the bank card is found by collecting a photo of the bank card, and a virtual bank card consistent with the original bank card is generated in the intelligent terminal, so that a user's usual card using habit is better satisfied. Therefore, the technical solution is advantageous to desired user experience.

Optionally, the bank card background picture may be specifically a high-definition bank card background picture.

Optionally, the bank card information may further include a card issuing bank of the bank card.

Optionally, a method for implementing step S103 may be specifically as follows:

searching, based on the information about the bank card pattern, the card issuing bank of the bank card for the bank card background picture that matches the information about the bank card pattern. In this manner, a quantity of searching times can be effectively reduced, and matching accuracy can be increased.

Figure 2:
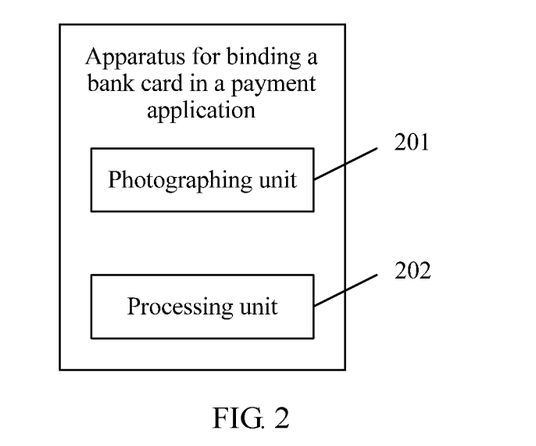
FIG. 2 is a schematic structural diagram of an apparatus for binding a bank card in a payment application according to another embodiment of this application.

FIG. 2 shows an apparatus for binding a bank card in a payment application according to another embodiment of the present disclosure. The apparatus is shown in FIG. 2, and includes:

a photographing unit 201, configured to obtain a picture of a to-be-bound bank card; and a processing unit 202, configured to: identify the picture of the bank card to obtain bank card information, where the bank card information includes a card number of the bank card and information about a bank card pattern; search, based on the information about the bank card pattern, for a bank card background picture that matches the information about the bank card pattern; and superimpose the card number of the bank card on the bank card background picture to obtain a virtual bank card consistent with the bank card, and store the virtual bank card.

According to the apparatus provided in this application, the photographing unit obtains the picture of the bank card, and then the processing unit automatically identifies the picture of the bank card to obtain the card number, and binds the bank card, so that an operation of binding the bank card is more convenient. The processing unit finds a high-resolution background pattern corresponding to the bank card by collecting a photo of the bank card, and generates a virtual bank card consistent with the original bank card in an intelligent terminal, so that a user's usual card using habit is better satisfied. Therefore, the apparatus is advantageous to desired user experience.

Optionally, the bank card information further includes a card issuing bank of the bank card.

Optionally, the processing unit 202 is specifically configured to search, based on the information about the bank card pattern, a background picture set of the card issuing bank of the bank card for the bank card background picture that matches the information about the bank card pattern.

The processing unit 202 searches only the background picture set of the card issuing bank of the bank card for the information about the bank card pattern, so that a quantity of pattern searching times can be effectively reduced, and pattern searching accuracy can be increased.

Optionally, the processing unit 202 is specifically configured to: extract a local feature point of the bank card pattern, gather all local feature points to obtain a first feature point set, extract local feature points of all bank card patterns in a database, and gather the local feature points of all the bank card patterns in the database to obtain a second feature point set; find, from the second feature point set, a feature point that matches the first feature point set, and set, as a candidate similar bank card picture, a bank card picture corresponding to the matched feature point in the second feature point set; and collect statistics about a quantity of matched feature points in each candidate similar bank card picture, and determine a candidate similar bank card picture with a largest quantity of matched features as the bank card background picture that matches the information about the bank card pattern.

The processing unit gathers feature points of all background pictures together, so that repeated matching can be effectively performed on the feature points. For bank cards, feature points such as patterns of the bank cards are more likely to be the same. If each card is matched, a feature point of each card needs to be matched with a feature point of the to-be-bound bank card. This is unimaginable for big data processing, and an identification speed is greatly reduced. However, with all feature points gathered, each same feature point is matched only once, so that repeated matching is avoided. Therefore, the apparatus is advantageous to a reduced data calculation amount.

Optionally, the processing unit 202 is further configured to: calculate a difference between a value of the largest quantity of matched feature points and a value of a second largest quantity of matched feature points, and when the difference is greater than a specified threshold, determine the candidate similar bank card picture corresponding to the value of the largest quantity of matched feature points as the bank card background picture that matches the information about the bank card pattern; or when the difference is less than a specified threshold, extract all feature points of a corresponding bank card background picture with the largest quantity of matched feature points, and if all the feature points have a same consistency function, determine the corresponding bank card background picture with the largest quantity of matched feature points as the bank card background picture that matches the information about the bank card pattern; or if all the feature points have different consistency functions, determine that there is no bank card background picture that matches the information about the bank card pattern.

Figure 3:
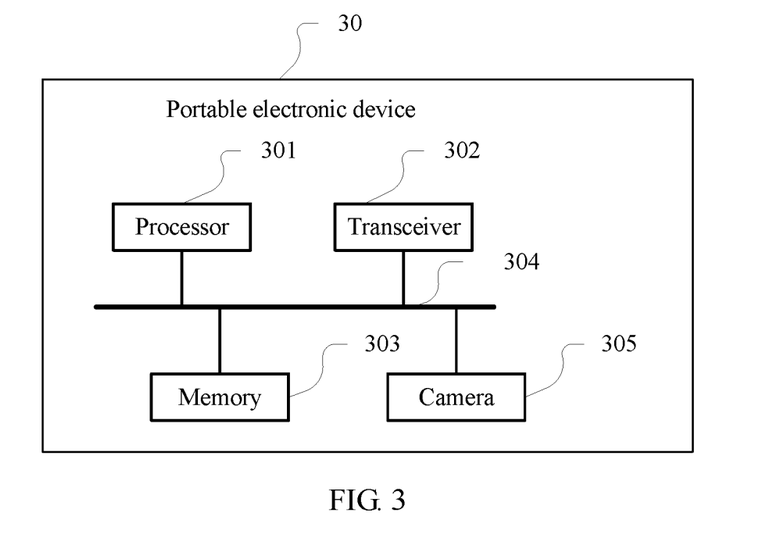
FIG. 3 is a schematic structural diagram of a portable electronic device according to this application.

FIG. 3 is a simplified schematic diagram of another portable electronic device 30 according to an embodiment of this application. The portable electronic device 30 includes but is not limited to a mobile phone, a tablet computer, a smartwatch, and a smart band. As shown in FIG. 3, the portable electronic device 30 includes a processor 301, a memory 302, a transceiver 303, a camera 305, and a bus 304. The transceiver 303 is configured to transmit and receive data with an external device. The device 30 may include one or more processors 301. In some embodiments of this application, the processor 301, the memory 302, and the transceiver 303 may be connected by using a bus system or in another manner. The device 30 may be configured to perform the method in step S102 to step S104 shown in FIG. 1. For meanings of terms and examples in this embodiment, refer to a description corresponding to FIG. 1. Details are not described herein again.

The camera 305 is configured to obtain a picture of a to-be-bound bank card.

The memory 302 stores program code. The processor 301 is configured to invoke the program code stored in the memory 302 to perform the following operation:

The processor 301 is configured to: identify the picture of the bank card to obtain bank card information, where the bank card information includes a card number of the bank card and information about a bank card pattern; search, based on the information about the bank card pattern, for a bank card background picture that matches the information about the bank card pattern; and superimpose the card number of the bank card on the bank card background picture to obtain a virtual bank card consistent with the bank card.

It should be noted that the processor 301 herein may be one processing element or a general term for a plurality of processing elements. For example, the processing element may be a central processing unit (Central Processing Unit, CPU) or an application-specific integrated circuit (Application-Specific Integrated Circuit, ASIC), or may be configured as one or more integrated circuits that implement the embodiments of this application, for example, one or more microprocessors (digital signal processor, DSP) or one or more field programmable gate arrays (Field Programmable Gate Array, FPGA).

The memory 303 may be a storage apparatus or a general term for a plurality of storage elements, and is configured to store executable program code, or a parameter, data, and the like required for running an application program running apparatus. In addition, the memory 303 may include a random access memory (RAM) or a non-volatile memory (non-volatile memory), for example, a magnetic disk memory or a flash (Flash).

The bus 304 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used in FIG. 3 for representation, but it does not mean that there is only one bus or only one type of bus.

The user equipment may further include an input/output apparatus connected to the bus 304, so that the input/output apparatus is connected to other parts such as the processor 301 by using the bus. The input/output apparatus may provide an input graphical user interface for an operator, so that the operator selects a control option by using the input graphical user interface. Alternatively, the input/output apparatus may be another interface, and another external device may be connected by using this interface.

Figure 4:
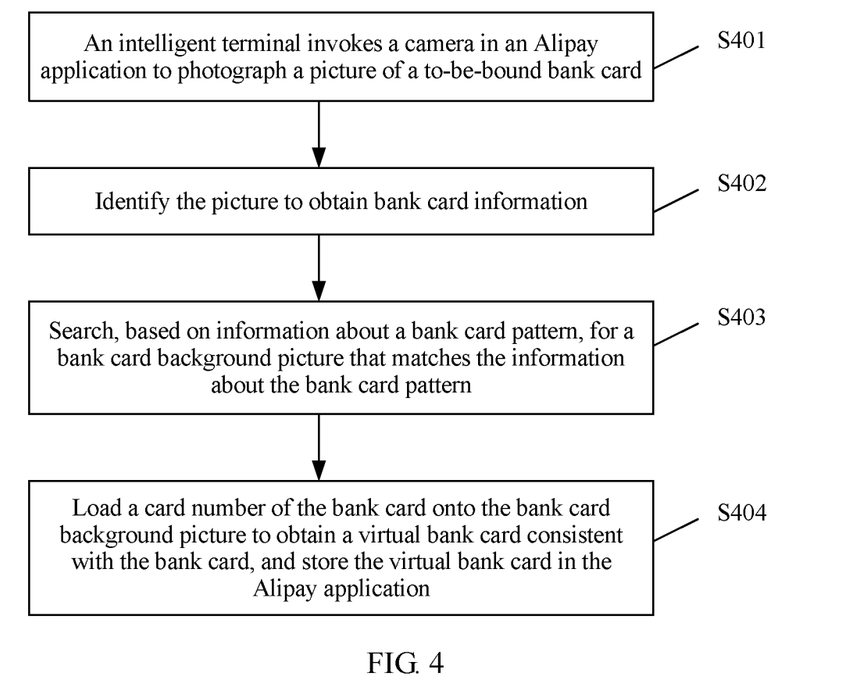
FIG. 4 is a flowchart of a method for binding a bank card in a payment application according to still another embodiment of this application.

As shown in FIG. 4, still another embodiment of this application further provides a method for binding a bank card in a payment application. The intelligent terminal includes but is not limited to a mobile phone, a tablet computer, and a personal digital assistant (English full name: Personal Digital Assistant, PDA for short). This embodiment is implemented in an Alipay payment application, and the method includes the following steps.

Step S401: The intelligent terminal invokes a camera in the Alipay application to photograph a picture of a to-be-bound bank card.

Step S402: The intelligent terminal identifies the picture to obtain bank card information, where the bank card information may include a card number of the bank card and information about a bank card pattern.

In step S402, an identification algorithm for identifying the picture may be an existing picture or text identification algorithm.

Step S403: Search, based on the information about the bank card pattern, for a bank card background picture that matches the information about the bank card pattern.

A method for implementing step S403 may be specifically as follows:

comparing the information about the bank card pattern with bank card background pictures in a database one by one, where a consistent bank card determined through the comparison is the bank card background picture that matches the information about the bank card pattern.

The database may be specifically a database stored in a memory of the intelligent terminal. Certainly, in actual application, bank cards in the database may be further periodically updated, and a method for updating the bank cards may be an existing update method. A specific manner of the updating is not limited in this application.

Certainly, a method for implementing step S403 may alternatively be as follows:

extracting a local feature point of the bank card pattern, gathering all local feature points to obtain a first feature point set, extracting local feature points of all bank card patterns in a database, and gathering the local feature points of all the bank card patterns to obtain a second feature point set, where the feature point may be described by using features such as SURF, ORB, and SIFT; where the feature point includes but is not limited to a shape, a color, and the like of the pattern;

finding, from the second feature point set, a feature point that matches the first feature point set, and setting, as a candidate similar bank card picture, a bank card picture corresponding to the matched feature point in the second feature point set; and collecting statistics about a quantity of matched feature points in each candidate similar bank card picture, and determining a candidate similar bank card picture with a largest quantity of matched features as the bank card background picture that matches the information about the bank card pattern.

In addition, when calculation is performed on a to-be-queried bank card background picture to obtain an image that matches the to-be-queried bank card background picture, because a negative sample without a corresponding bank card background picture needs to be excluded, a final result is determined based on a threshold that is set by collecting statistics about a plurality of samples.

A specific determining method may be as follows: calculating a difference between a value of the largest quantity of matched feature points and a value of a second largest quantity of matched feature points, and when the difference is greater than a specified threshold (which may be independently set by a user or a manufacturer), determining a candidate similar bank card picture with the largest quantity of matched feature points as the bank card background picture that matches the information about the bank card pattern; or when the difference is less than a specified threshold, extracting all feature points of a corresponding bank card background picture with the largest quantity of matched feature points, and if all the feature points have a same consistency function, determining the corresponding bank card background picture with the largest quantity of matched feature points as the bank card background picture that matches the information about the bank card pattern; or if all the feature points have different consistency functions, determining that there is no bank card background picture that matches the information about the bank card pattern.

In the foregoing pattern matching solution, a calculation amount of matching can be effectively reduced. Because in the pattern matching solution, feature points of all bank card background pictures are collected for picture comparison, there is no need to perform one-to-one comparison, so that a quantity of times of pattern comparison is effectively reduced. Therefore, the pattern matching solution is advantageous to a reduced calculation amount. In addition, the difference between the value of the largest quantity of matched feature points and the value of the second largest quantity of matched feature points is calculated, so that a phenomenon that no image is matched can be effectively avoided.

Step S404: Load the card number of the bank card onto the bank card background picture to obtain a virtual bank card consistent with the bank card, and store the virtual bank card in the Alipay application.

In the technical solution provided in this application, the camera is invoked by using the Alipay application to obtain the picture of the bank card, the picture of the bank card is automatically identified to obtain the card number, and the bank card is bound, so that an operation of binding the bank card is more convenient. A high-resolution background pattern corresponding to the bank card is found by collecting a photo of the bank card, and a virtual bank card consistent with the original bank card is generated in the intelligent terminal, and is stored in the Alipay application, so that a user's usual card using habit is better satisfied. Therefore, the technical solution is advantageous to desired user experience.

Figure 5:
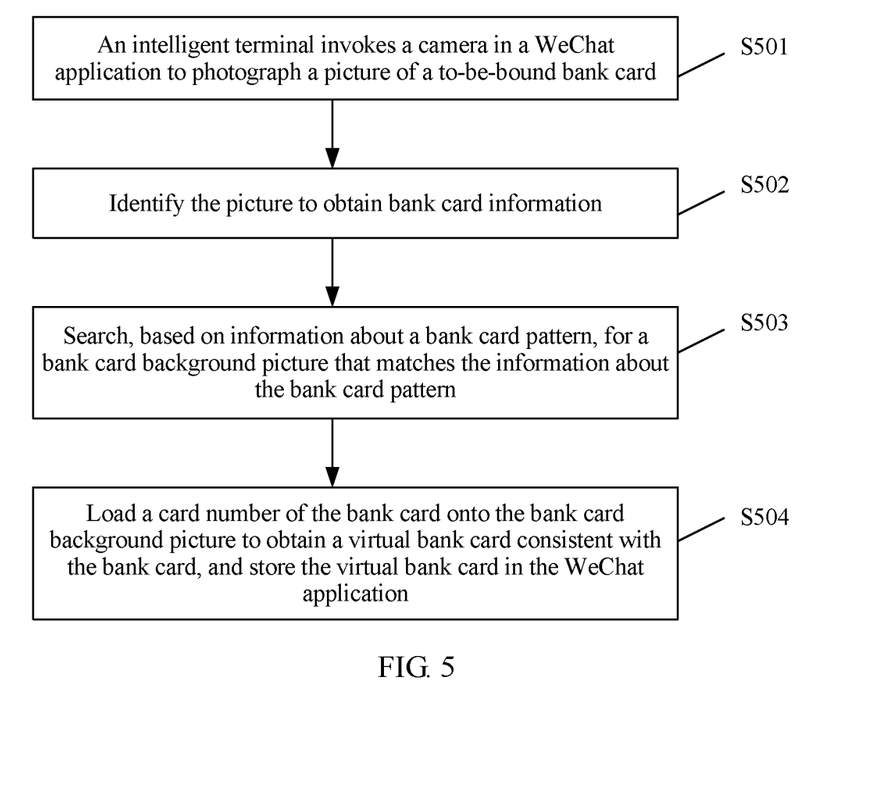
FIG. 5 is a flowchart of a method for binding a bank card in a payment application according to yet another embodiment of this application.

As shown in FIG. 5, yet another embodiment of this application further provides a method for binding a bank card in a payment application. The intelligent terminal includes but is not limited to a mobile phone, a tablet computer, and a personal digital assistant (English full name: Personal Digital Assistant, PDA for short). This embodiment is implemented in a WeChat payment application, and the method includes the following steps.

Step S501: The intelligent terminal invokes a camera in the WeChat application to photograph a picture of a to-be-bound bank card.

Step S502: The intelligent terminal identifies the picture to obtain bank card information, where the bank card information may include a card number of the bank card and information about a bank card pattern.

In step S502, an identification algorithm for identifying the picture may be an existing picture or text identification algorithm.

Step S503: Search, based on the information about the bank card pattern, for a bank card background picture that matches the information about the bank card pattern.

A method for implementing step S503 may be specifically as follows:

comparing the information about the bank card pattern with bank card background pictures in a database one by one, where a consistent bank card determined through the comparison is the bank card background picture that matches the information about the bank card pattern.

The database may be specifically a database stored in a memory of the intelligent terminal. Certainly, in actual application, bank cards in the database may be further periodically updated, and a method for updating the bank cards may be an existing update method. A specific manner of the updating is not limited in this application.

Certainly, a method for implementing step S403 may alternatively be as follows:

extracting a local feature point of the bank card pattern, gathering all local feature points to obtain a first feature point set, extracting local feature points of all bank card patterns in a database, and gathering the local feature points of all the bank card patterns to obtain a second feature point set, where the feature point may be described by using features such as SURF, ORB, and SIFT; where the feature point includes but is not limited to a shape, a color, and the like of the pattern;

finding, from the second feature point set, a feature point that matches the first feature point set, and setting, as a candidate similar bank card picture, a bank card picture corresponding to the matched feature point in the second feature point set; and collecting statistics about a quantity of matched feature points in each candidate similar bank card picture, and determining a candidate similar bank card picture with a largest quantity of matched features as the bank card background picture that matches the information about the bank card pattern.

In addition, when calculation is performed on a to-be-queried bank card background picture to obtain an image that matches the to-be-queried bank card background picture, because a negative sample without a corresponding bank card background picture needs to be excluded, a final result is determined based on a threshold that is set by collecting statistics about a plurality of samples.

A specific determining method may be as follows: calculating a difference between a value of the largest quantity of matched feature points and a value of a second largest quantity of matched feature points, and when the difference is greater than a specified threshold (which may be independently set by a user or a manufacturer), determining a candidate similar bank card picture with the largest quantity of matched feature points as the bank card background picture that matches the information about the bank card pattern; or when the difference is less than a specified threshold, extracting all feature points of a corresponding bank card background picture with the largest quantity of matched feature points, and if all the feature points have a same consistency function, determining the corresponding bank card background picture with the largest quantity of matched feature points as the bank card background picture that matches the information about the bank card pattern; or if all the feature points have different consistency functions, determining that there is no bank card background picture that matches the information about the bank card pattern.

In the foregoing pattern matching solution, a calculation amount of matching can be effectively reduced. Because in the pattern matching solution, feature points of all bank card background pictures are collected for picture comparison, there is no need to perform one-to-one comparison, so that a quantity of times of pattern comparison is effectively reduced. Therefore, the pattern matching solution is advantageous to a reduced calculation amount. In addition, the difference between the value of the largest quantity of matched feature points and the value of the second largest quantity of matched feature points is calculated, so that a phenomenon that no image is matched can be effectively avoided.

Step S504: Load the card number of the bank card onto the bank card background picture to obtain a virtual bank card consistent with the bank card, and store the virtual bank card in the WeChat application.

In the technical solution provided in this application, the camera is invoked by using the WeChat application to obtain the picture of the bank card, the picture of the bank card is automatically identified to obtain the card number, and the bank card is bound, so that an operation of binding the bank card is more convenient. A high-resolution background pattern corresponding to the bank card is found by collecting a photo of the bank card, and a virtual bank card consistent with the original bank card is generated in the intelligent terminal, and is stored in the WeChat application, so that a user's usual card using habit is better satisfied. Therefore, the technical solution is advantageous to desired user experience.

It should be noted that, for brief description, the foregoing method embodiments are represented as a series of actions. However, a person skilled in the art should appreciate that this application is not limited to the described order of the actions, because according to this application, some steps may be performed in other orders or simultaneously. In addition, a person skilled in the art should also appreciate that the related actions and modules are not necessarily mandatory to this application.

In the foregoing embodiments, the descriptions of the embodiments have respective focuses. For a part that is not described in detail in an embodiment, refer to related descriptions in other embodiments.

The foregoing describes in detail the content download method, the related device, and the apparatus provided in the embodiments of this application. In this specification, specific examples are used to describe the principle and implementations of this application, and the description of the embodiments is only intended to help understand the method and core idea of this application; in addition, a person of ordinary skill in the art may, based on the idea of this application, make modifications with respect to the specific implementations and the application scope. Therefore, the content of this specification shall not be construed as a limitation to this application.

What is claimed is:

1. A method for binding a bank card in a payment application, comprising:
    obtaining, by a camera, a picture of a to-be-bound bank card;
    identifying, by a processor, the picture of the to-be-bound bank card to obtain bank card information, wherein the bank card information comprises a card number of the to-be-bound bank card and information about a bank card pattern;
    searching, by the processor and based on the information about the bank card pattern, for a bank card background picture that matches the information about the bank card pattern, wherein the searching comprises:
        extracting local feature points of the bank card pattern to obtain a first feature point set;
        extracting local feature points of all bank card patterns in a database to obtain a second feature point set;
        finding feature points from the second feature point set that match the first feature point set;
        setting, as one or more candidate similar bank card pictures, one or more bank card pictures in the database that correspond to matched feature points in the second feature point set;
        counting a quantity of matched feature points in each candidate similar bank card picture of the one or more candidate similar bank card pictures; and
        determining a candidate similar bank card picture according to a difference between a first value of a largest quantity of matched feature points in a candidate similar bank card picture and a second value of a second largest quantity of matched feature points in the candidate similar bank card picture;
    superimposing, by the processor, the card number of the to-be-bound bank card on the bank card background picture to obtain a virtual bank card consistent with the to-be-bound bank card; and
    storing the virtual bank card.

2. The method of claim 1, wherein the bank card information further comprises a card issuing bank of the to-be-bound bank card.

3. The method of claim 2, wherein the searching comprises searching, based on the information about the bank card pattern, a background picture set of a card issuing bank of the to-be-bound bank card for the bank card background picture that matches the information about the bank card pattern.

4. The method according to of claim 1, further comprising:
    calculating the difference between the first value and the second value; and
    determining the candidate similar bank card picture that corresponds to the first value as the bank card background picture that matches the information about the bank card pattern when the difference is greater than a specified threshold.

5. The method of claim 1, further comprising:
    calculating the difference between the first value and the second value;
    extracting all feature points of a corresponding bank card background picture with the largest quantity of matched feature points when the difference is less than a specified threshold; and
    determining the corresponding bank card background picture with the largest quantity of matched feature points as the bank card background picture that matches the information about the bank card pattern when all the feature points of the corresponding bank card background picture with the largest quantity of matched feature points have a same consistency function.

6. The method of claim 1, further comprising:
    calculating the difference between the first value and the second value;
    extracting all feature points of a corresponding bank card background picture with the largest quantity of matched feature points when the difference is less than a specified threshold; and
    determining that the database has no bank card background picture that matches the information about the bank card pattern when all the feature points of the corresponding bank card background picture with the largest quantity of matched feature points have different consistency functions.

7. An apparatus for binding a bank card in a payment application, comprising:
    a camera, configured to obtain a picture of a to-be-bound bank card; and
    a processor, configured to:
        identify the picture of the to-be-bound bank card to obtain bank card information, wherein the bank card information comprises a card number of the to-be-bound bank card and information about a bank card pattern;
        search, based on the information about the bank card pattern, for a bank card background picture that matches the information about the bank card pattern, wherein searching for the bank card background picture comprises:
    extracting local feature points of the bank card pattern to obtain a first feature point set;
    extracting local feature points of all bank card patterns in a database to obtain a second feature point set;
    finding feature points from the second feature point set that match the first feature point set;
    setting, as one or more candidate similar bank card pictures, one or more bank card pictures in the database that correspond to matched feature points in the second feature point set;
    counting a quantity of matched feature points in each candidate similar bank card picture of the one or more candidate similar bank card pictures; and
    determining a candidate similar bank card picture according to a difference between a first value of a largest quantity of matched feature points in a candidate similar bank card picture and a second value of a second largest quantity of matched feature points in the candidate similar bank card picture;
superimpose the card number of the to-be-bound bank card on the bank card background picture to obtain a virtual bank card consistent with the to-be-bound bank card; and
store the virtual bank card.

8. The apparatus of claim 7, wherein the bank card information further comprises a card issuing bank of the to-be-bound bank card.

9. The apparatus of claim 7, wherein the processor is configured to search, based on the information about the bank card pattern, a background picture set of the card issuing bank of the to-be-bound bank card for the bank card background picture that matches the information about the bank card pattern.

10. The apparatus of claim 7, wherein the processor is further configured to:
    calculate the difference between the first value and the second value; and
    determine the candidate similar bank card picture that corresponds to the first value as the bank card background picture that matches the information about the bank card pattern when the difference is greater than a specified threshold.

11. The apparatus of claim 7, wherein the processor is further configured to:
    calculate the difference between the first value and the second value;
    extract all feature points of a corresponding bank card background picture with the largest quantity of matched feature points when the difference is less than a specified threshold; and
    determine the corresponding bank card background picture with the largest quantity of matched feature points as the bank card background picture that matches the information about the bank card pattern when all the feature points of the corresponding bank card background picture with the largest quantity of matched feature points have a same consistency function.

12. The apparatus of claim 7, wherein the processor is further configured to:
    calculate the difference between the first value and the second value;
    extract all feature points of a corresponding bank card background picture with the largest quantity of matched feature points when the difference is less than a specified threshold; and
    determine that the database has no bank card background picture that matches the information about the bank card pattern when all the feature points of the corresponding bank card background picture with the largest quantity of matched feature points have different consistency functions.

13. A portable electronic device, comprising:
a processor;
a memory coupled to the processor to store instructions;
a transceiver coupled to the processor; and
a camera coupled to the processor and configured to obtain a picture of a to-be-bound bank card, wherein the processor is configured to execute the instructions to cause the portable electronic device to be configured to:
    obtain a picture of the to-be-bound bank card;
    identify the picture of the to-be-bound bank card to obtain bank card information, wherein the bank card information comprises a card number of the to-be-bound bank card and information about a bank card pattern;
search, based on the information about the bank card pattern, for a bank card background picture that matches the information about the bank card pattern, wherein searching for the bank card picture comprises:
    extracting local feature points of the bank card pattern to obtain a first feature point set;
    extracting local feature points of all bank card patterns in a database to obtain a second feature point set;
    finding feature points from the second feature point set that match the first feature point set;
    setting, as one or more candidate similar bank card pictures, one or more bank card pictures in the database that correspond to matched feature points in the second feature point set;
    counting a quantity of matched feature points in each candidate similar bank card picture of the one or more candidate similar bank card pictures; and
    determining a candidate similar bank card picture according to a difference between a first value of a largest quantity of matched feature points in a candidate similar bank card picture and a second value of a second largest quantity of matched feature points in the candidate similar bank card picture;
    superimpose the card number of the bank card on the bank card background picture to obtain a virtual bank card consistent with the to-be-bound bank card; and
    storing the virtual bank card.

14. The portable electronic device of claim 13, wherein the bank card information further comprises a card issuing bank of the to-be-bound bank card.

15. The portable electronic device of claim 13, wherein the processor is configured to search, based on the information about the bank card pattern, a background picture set of the card issuing bank of the to-be-bound bank card for the bank card background picture that matches the information about the bank card pattern.

16. The portable electronic device according to claim 13, wherein the processor is further configured to:

calculate the difference between the first value and the second value of a second largest quantity of matched feature points in a candidate similar bank card picture; and determine the candidate similar bank card picture that corresponds to the first value as the bank card background picture that matches the information about the bank card pattern when the difference is greater than a specified threshold.

17. A non-transitory computer readable storage medium storing a computer program used for an electronic data exchange, that when executed by a processor causes a computer to be configured to:

obtain a picture of a to-be-bound bank card;

identify the picture of the to-be-bound bank card to obtain bank card information, wherein the bank card information comprises a card number of the to-be-bound bank card and information about a bank card pattern;

search, based on the information about the bank card pattern, for a bank card background picture that matches the information about the bank card pattern, wherein searching for the bank card background picture comprises:

extracting local feature points of the bank card pattern to obtain a first feature point set;

extracting local feature points of all bank card patterns in a database to obtain a second feature point set;

finding feature points from the second feature point set that match the first feature point set;

setting, as one or more candidate similar bank card pictures, one or more bank card pictures in the database that correspond to matched feature points in the second feature point set;

counting a quantity of matched feature points in each candidate similar bank card picture of the one or more candidate similar bank card pictures; and determining a candidate similar bank card picture according to a difference between a first value of a largest quantity of matched feature points in a candidate similar bank card picture and a second value of a second largest quantity of matched feature points in the candidate similar bank card picture;

superimpose the card number of the to-be-bound bank card on the bank card background picture to obtain a virtual bank card consistent with the to-be-bound bank card; and store the virtual bank card.

18. The non-transitory computer readable storage medium of claim 17, wherein the bank card information further comprises a card issuing bank of the to-be-bound bank card.

19. The non-transitory computer readable storage medium method of claim 18, wherein the computer program further causes the computer to be configured to search, based on the information about the bank card pattern, a background picture set of the card issuing bank of the to-be-bound bank card for the bank card background picture that matches the information about the bank card pattern.

20. A computer program product, wherein the computer program product comprises a non-transitory computer readable storage medium that stores a computer program, and the computer program may be operated to enable a computer to be configured to:

obtain a picture of a to-be-bound bank card;

identify the picture of the to-be-bound bank card to obtain bank card information, wherein the bank card information comprises a card number of the to-be-bound bank card and information about a bank card pattern;

search, based on the information about the bank card pattern, for a bank card background picture that matches the information about the bank card pattern, wherein searching for the bank card background picture comprises:

extracting local feature points of the bank card pattern to obtain a first feature point set;

extracting local feature points of all bank card patterns in a database to obtain a second feature point set;

finding feature points from the second feature point set that match the first feature point set;

setting, as one or more candidate similar bank card pictures, one or more bank card pictures in the database that correspond to matched feature points in the second feature point set;

counting a quantity of matched feature points in each candidate similar bank card picture of the one or more candidate similar bank card pictures; and determining a candidate similar bank card picture according to a difference between a first value of a largest quantity of matched feature points in a candidate similar bank card picture and a second value of a second largest quantity of matched feature points in the candidate similar bank card picture;

superimpose the card number of the to-be-bound bank card on the bank card background picture to obtain a virtual bank card consistent with the to-be-bound bank card; and store the virtual bank card.

* * * * *